United States Patent [19]
Henderson et al.

[11] Patent Number: 5,182,086
[45] Date of Patent: Jan. 26, 1993

[54] OIL VAPOR EXTRACTION SYSTEM

[76] Inventors: Charles A. Henderson, 29 W. 326 Helen, W. Chicago, Ill. 60185; Terry D. Henderson, 1100 Queens Ct., Naperville, Ill. 60540

[21] Appl. No.: 636,769

[22] Filed: Jan. 2, 1991

Related U.S. Application Data

[60] Continuation-in-part of Ser. No. 408,439, Sep. 15, 1989, abandoned, which is a continuation-in-part of Ser. No. 223,706, Jul. 22, 1988, abandoned, which is a continuation of Ser. No. 26,955, Mar. 17, 1987, abandoned, which is a division of Ser. No. 857,712, Apr. 30, 1986, abandoned.

[51] Int. Cl.$^5$ .......................... B01D 50/00; F01N 3/10
[52] U.S. Cl. ..................................... 422/171; 422/110; 422/114; 422/115; 422/173; 422/174; 422/175; 422/179; 423/245.1; 423/245.3; 60/288
[58] Field of Search ........ 422/110, 114, 115, 173-175, 422/171, 179; 423/245.1, 245.3; 60/288

[56] References Cited

U.S. PATENT DOCUMENTS

| | | | |
|---|---|---|---|
| 2,965,439 | 12/1964 | Andersen et al. | 423/245.5 |
| 3,097,918 | 7/1963 | Moen | 423/245.5 |
| 3,600,142 | 8/1971 | Fessler | 422/179 X |
| 3,950,154 | 4/1976 | Henderson et al. | 55/179 |
| 4,089,655 | 5/1978 | Razete | 422/120 |
| 4,091,072 | 5/1978 | McArthur | 422/211 |
| 4,225,323 | 9/1980 | Zarchy et al. | 422/174 |
| 4,299,600 | 11/1981 | Kobashi | 422/115 |
| 4,323,542 | 4/1982 | Joy, III | 423/245 S |
| 5,061,464 | 10/1991 | Cordonna, Jr. et al. | 423/245.3 X |

FOREIGN PATENT DOCUMENTS 2103593 2/1983 United Kingdom .

OTHER PUBLICATIONS

Summers et al., Volatile Organic Compounds Emission Control by Catalysts, Allied Signal, Oct. 1989.

*Primary Examiner*—Robert J. Warden
*Assistant Examiner*—Stephanie Blythe
*Attorney, Agent, or Firm*—Trexler, Bushnell, Giangiorgi & Blackstone, Ltd.

[57] ABSTRACT

A method for removing hydrocarbons from a stream of compressed air for use in a compressed air supply and delivery system of the type wherein a supply of compressed air is provided by a lubricated or non-lubricated air compressor includes the passing of the compressed air from the lubricated air compressor through a catalytic oxidation system to remove hydrocarbons, including vapor phase hydrocarbons, from the compressed air stream. The method contemplates feeding the stream of compressed air from an outlet of the air compressor to a treatment station, which treatment station utilizes a catalytic oxidation system to remove the hydrocarbons from the compressed air stream, thereby oxidizing the hydrocarbons into carbon dioxide and water and removing a predetermined, relatively high percentage of existing hydrocarbons from the compressed air stream prior to reaching downstream portions of the delivery system and any connected utilization apparatus. A compressed air system in which the foregoing method is carried out also forms a part of the invention. The invention also extends to a catalytic oxidation system for use in removing hydrocarbons, including vapor phase hydrocarbons, from a compressed air stream.

21 Claims, 2 Drawing Sheets

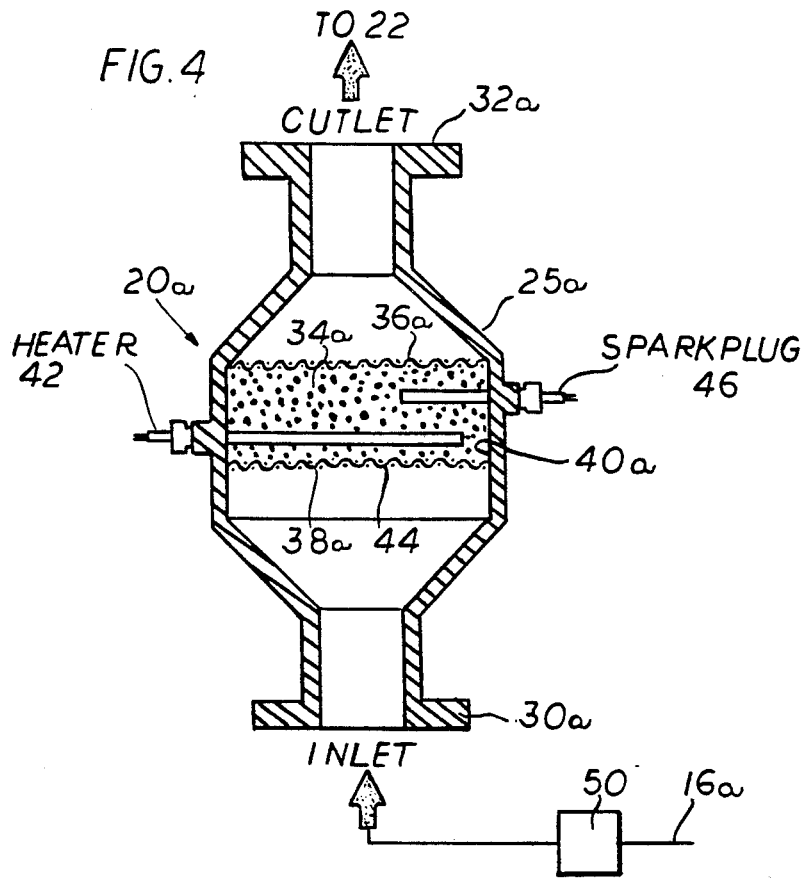
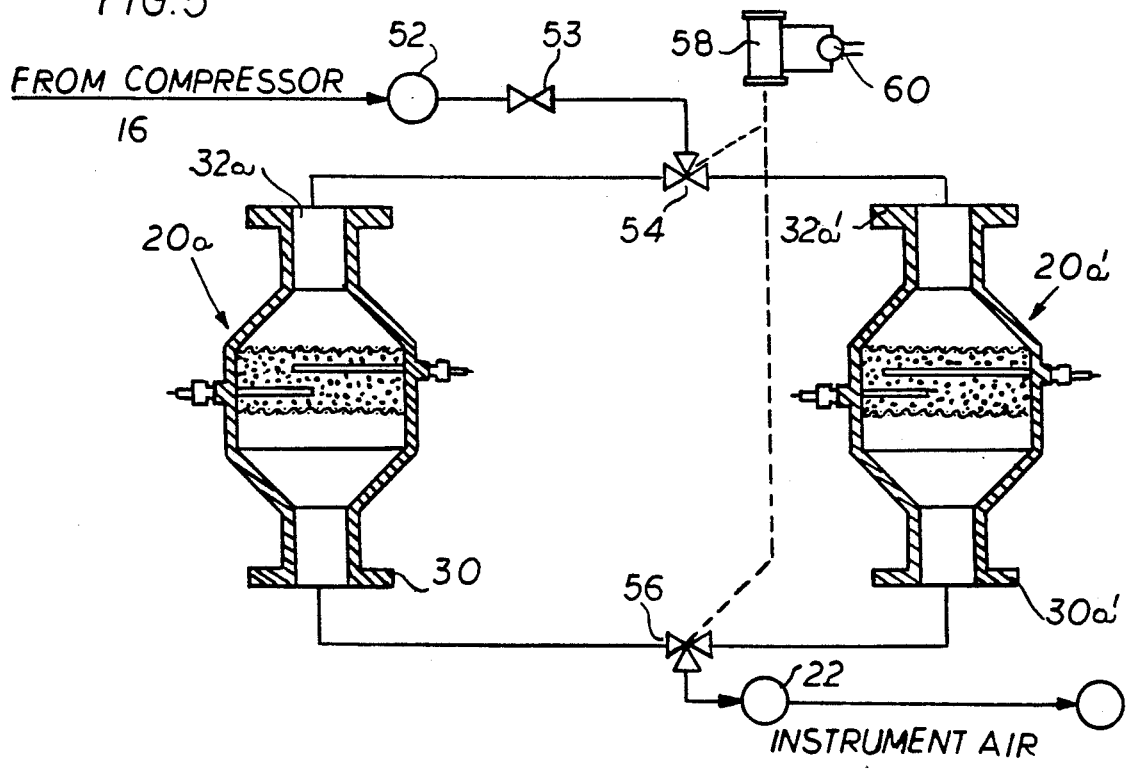

OIL VAPOR EXTRACTION SYSTEM

This application is a continuation-in-part, of application Ser. No. 408,439, filed Sep. 15, 1989 abandoned, which is a continuation-in-part of application Ser. No. 07/223,706, filed Jul. 22, 1988, abandoned, which is a continuation of application Ser. No. 07/026,955, filed Mar. 17, 1987, abandoned, which is a divisional of application Ser. No. 06/857,712, filed Apr. 30, 1986, abandoned.

BACKGROUND OF THE INVENTION

The invention concerns a novel method and apparatus for the removal of hydrocarbons from a compressed air/gas stream. Specifically, the invention utilizes a catalytic oxidation method and system to remove hydrocarbons from compressed air.

Compressed air and/or gas has a wide variety of industrial uses. For example, compressed air or gas may be utilized to transmit power, such as in a system for operating pneumatic tools. Alternatively, compressors are often utilized to provide air for combustion in various apparatus. Compressed air may also be utilized to transport and distribute material, such as in air conveying. Compressed air is also used in instrumentation systems throughout industry. Other uses for compressed air or gas include producing or creating conditions more conducive to certain chemical reactions or processes, as well as producing and maintaining desired pressure levels for many purposes. Such uses may require the removal of contaminants which have either leaked or flowed into the system, or are initially present, although unwanted.

Generally speaking, compressed air or gas may be generated by either oil-lubricated type compressors (hereinafter "lubricated compressor(s)") or oil-free, non-lubricated type compressors. The latter oil-free or non-lubricated type compressors are relatively expensive to manufacture, operate and maintain. In this regard, the initial cost of purchasing or providing such a non-lubricated compressor is higher than a comparable oil lubricated type compressor. Moreover, non-lubricated compressors generally consume significantly greater quantities of energy in operation, being typically from 3 percent to 15 percent less efficient than lubricated compressors. Hence, in general, non-lubricated compressors cost 15 percent to 100 percent more than lubricated compressors to purchase initially and require about 25 percent to 50 percent more maintenance. Heretofore, many industrial users have been willing to absorb these higher costs because of problems caused by compressor lubricants in the less expensive lubricated type of compressors.

In this latter regard, while oil-lubricated compressors are more energy efficient, cost significantly less to purchase and require less maintenance than non-lubricated compressors, lubricating oil carry-over (hydrocarbons) in the downstream compressed air causes a number of problems in practice.

Due to the relatively high temperatures and pressures utilized in the air compression process, the lubricants in the downstream air undergo several changes. The oils have in effect been fractionated and cracked and have lost, or been greatly reduced in, their lubricating properties. These oils or hydrocarbons often further mix with water and/or solid particulate matter or "dirt" present in the air/gas stream which may cause severe damage to downstream components. Such problems may include washing away of lubricants required on the downstream instruments or machinery resulting in increased wear and increased required maintenance thereof. This combination of oil, dirt and water in the downstream air can also cause automatic valves, cylinders and like equipment to operate either slowly, unreliably or not at all, as well as causing malfunctions of instrumentation in the air/gas stream. In some systems, product spoilage is caused by these unwanted contaminants, and excessive rust and/or abrasion of downstream parts or products may occur. It has also been found that these contaminants in the air/gas stream can cause outdoor air lines to freeze in cold weather.

Additionally, in an air compressor system, oxygen is always present, and where petroleum oils are used as a lubricant, there must be some concern for the potential of fire or explosion in the system. A source of energy for ignition may be provided by friction, static electricity or heat from the compressor, often in the form of hot carbon particles in the air/gas stream. Most commonly, the petroleum oils used as a lubricant, and present to some degree in the air/gas stream, decompose to form such carbon particles. These particles form deposits which tend to collect on the valves, heads, discharge ports, and in piping in delivery and utilization systems. Tests have shown that such carbon deposits absorb oxygen from the air and under certain conditions generate heat. This heat may reach a point where ignition occurs in the carbon deposits, and such ignition may cause further fire or explosion elsewhere in the system, as well.

Moreover, many treatment systems include drying devices for removing moisture from the compressed air. These drying devices generally work by heating the compressed air, which is often initially at a relatively elevated temperature from compression. In the presence of such relatively elevated temperatures and heating devices, the presence of hydrocarbons in the system can pose a danger of fire or explosion. That is, the hydrocarbon based compressor lubricant lost through bypass or thermal cracking is often transmitted into the compressed air, and the resulting hydrocarbons contaminate treatment and/or distribution systems downstream, often becoming trapped in treatment sections where they sometimes ignite or detonate. In this regard, conventional treatment sections often include mechanical oil filtering devices. While oil and cracked oil products are always present as low concentration contaminants in lubricated systems, concentration can rise over long periods of operation to a point where serious problems are caused or threatened. Such problems are particularly acute for drying systems which operate at elevated temperatures and therefore can more easily cause ignition in the presence of excess hydrocarbons.

A number of lubricants are utilized in air compressors, refined petroleum products being the most prevalent. Synthetic type lubricants are also utilized, and these latter materials are believed to provide a lesser danger of fire or explosion in a system. However, volatile pyrolysis products are often produced for such synthetics in the system which can still cause a danger of fire or explosion. Synthetic lubricants have other disadvantages as well. Due to the energy intensive manufacturing processes utilized in their production, synthetic lubricants are from five to seven times as expensive as petroleum based lubricants. Additionally, most synthetic lubricants tend to exhibit relatively low viscosity, causing low temperature handling problems. Moreover, many commonly used gasket, seal packing and lubricator materials are attacked by synthetic lubricants.

In addition to the foregoing, one particularly advantageous type of dryer, known as a regenerative heat of compression drying system generally cannot be utilized with lubricated compressors. Such heat of compression drying systems generally reuse the heat energy generated during the compression process which is otherwise lost as waste heat energy. Hence, such heat of compression type dryers are relatively inexpensive to operate. Since they utilize a source of energy already present in the system, such dryers virtually eliminate the conventional energy costs of drying air. However, these energy efficient heat of compression drying systems operate at elevated temperatures such that they are normally ruled out for use in connection with lubricated type compressors. That is, because of the presence of hydrocarbons in the downstream flow from such lubricated compressors, the relatively high temperature of operation of heat of compression drying systems is generally believed to pose too great a threat of auto ignition to justify their use.

While, as mentioned above, mechanical filters have been utilized in an effort to remove hydrocarbons from the compressed air stream from lubricated compressors, such mechanical filtering is of limited usefulness. For example, a typical filter operates in liquid phase and hence can only remove hydrocarbons in liquid phase from the air stream. However, since the air is generally at an elevated temperature leaving the compressor and can approach saturation with oil vapor, hydrocarbons or oil products still in vapor form will pass through the filter, and as the air cools downstream of the filter, will condense into the liquid state.

Moreover, conventional filters require daily draining and periodic replacement of filter cartridges, in the absence of which they rapidly become ineffective. Such maintenance procedures are of course relatively time consuming and expensive and can require system shutdown to carry out. However, as mentioned above, even properly maintained filters can collect a quantity of hydrocarbons over a period of operation, thus posing potential ignition or detonation dangers in the presence of the elevated temperatures of the compressed air and gases in the system.

The development of hydrocarbon catalysis coincides with the arrival of the petroleum age, when natural oil and gas provide most of our energy and an increasing share of raw materials for chemical industry. According to the well known principles of catalytic action, unstable species may result when a hydrocarbon molecule collides with the active center of a catalyst. The nature and reactivity of these intermediates determine the products of catalysis and the rate of reaction.

Vapor phase catalytic oxidation and reduction is used for the removal of a large variety of objectionable compounds from many types of gas streams. Catalytic oxidation is particularly suitable for removing small amounts of combustable contaminants from gas streams containing these compounds in concentrations below the flammable limit, and, therefore, has found wide application in the field of air pollution and odor control. Similar applications include automobile exhaust catalytic converters and carbon monoxide converters for breathing air in industrial compressed air systems. The catalytic oxidation apparatus and system for removal of hydrocarbons from compressed air/gas differs from these similar systems in several significant ways. Automotive exhaust systems are designed to remove trace amounts of hydrocarbons from atmospheric pressure emmission systems operated at extremely high temperatures for the protection of the environment. Carbon monoxide converters are used in industrial applications for the conversion of carbon monoxide, a potentially deadly contaminant, into harmless carbon dioxide when used in breathing air apparatus.

None of the catalysts utilized in these related applications would perform when tested in the catalytic oxidation system for removal of hydrocarbons in compressed air. The basic design considerations of the catalytic oxidation system preclude utilization of existing technology and in fact required the development of new catalysts and technology.

OBJECTS OF THE INVENTION

Accordingly it is a general object of the invention to provide a novel and improved method and apparatus for removing hydrocarbons from compressed air.

A more specific object is to provide a method and apparatus for removing hydrocarbons from compressed air which substantially overcomes the above-discussed problems.

A related object is to provide a method and apparatus in accordance with the foregoing objects which may be utilized in a system including a regenerative, heat of compression type drying apparatus.

A further related object is to provide a hydrocarbon removal apparatus and method in accordance with the foregoing objects which is relatively simple and inexpensive in its design, construction and operation and requires but minimal maintenance, and yet is highly reliable in operation.

BRIEF DESCRIPTION OF THE DRAWINGS

The features of the present invention which are believed to be novel are set forth with particularity in the appended claims. The organization and manner of operation of the invention, together with further objects and advantages thereof, may best be understood by reference to the following description taken in connection with the accompanying drawings in the several figures of which like reference numerals identify like elements, and in which:

FIG. 4 is an enlarged axial section similar to FIG. 2 of a catalytic oxidation system in accordance with a second embodiment of the invention; and FIG. 5 is a somewhat diagrammatic representation of an air compressor system utilizing a pair of catalytic oxidation systems in accordance with the embodiment of FIG. 4.

DETAILED DESCRIPTION OF THE ILLUSTRATED EMBODIMENT

The method and apparatus of the invention will be discussed hereinbelow with reference to the specific features of the illustrated embodiment. However, it should be understood that the invention is not limited to such specific features or to the illustrated embodiments but includes such modifications, alternatives and changes as may become apparent to those skilled in the art upon reading the foregoing discussion and following description and considering the accompanying drawings. Accordingly, it is intended that the invention include such modifications, alternatives and changes insofar as they fall within the spirit and scope of the appended claims.

Figure 1:
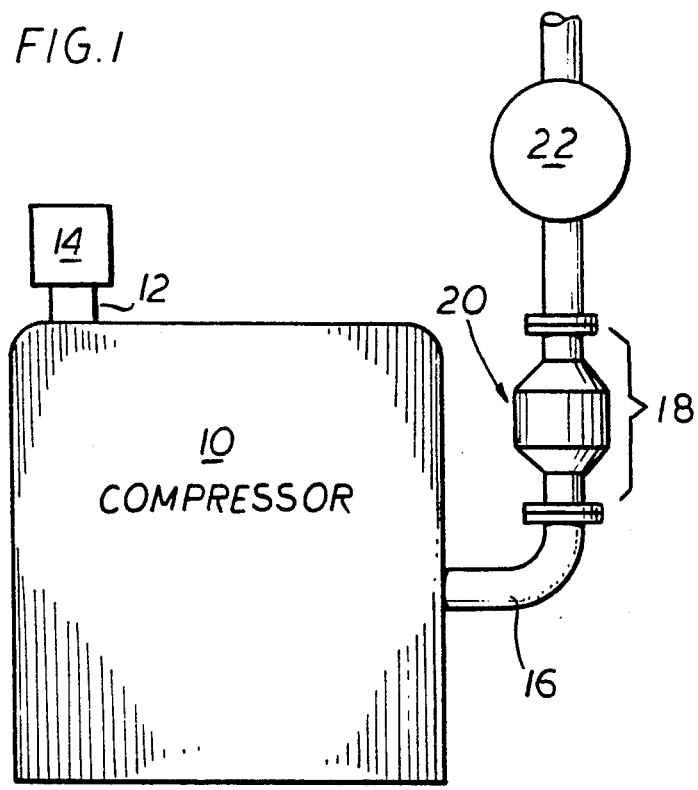
FIG. 1 is a somewhat diagrammatic representation of an air compressor system provided with a hydrocarbon removal system in accordance with the method and apparatus of the invention.

Referring now to the drawings, the method of the invention will initially be described in connection with the apparatus diagrammatically illustrated in FIG. 1. In accordance with the invention, there is provided a method for removing hydrocarbons from a stream of compressed air for use in a compressed air supply and delivery system of the type wherein a supply of compressed air is provided by an air compressor 10 which may be either a lubricated or a non-lubricated air compressor. Generally speaking, such a compressor has an air intake or inlet portion 12 which is often provided with a suitable intake filter 14. Compressed air produced by the compressor 10 is then delivered through a discharge outlet 16 to downstream delivery systems and/or utilization apparatus (not shown).

In accordance with the method of the invention, the stream of compressed air is fed from the outlet 16 of the air compressor 10 to a treatment station designated generally by reference numeral 18. Further in accordance with the invention, at this treatment station 18 the compressed air is treated by being passed through a catalytic oxidation apparatus or system to remove hydrocarbons including vapor phase hydrocarbons from the compressed air stream. In this regard, the treatment station 18 includes a catalytic oxidation apparatus designated generally by the reference numeral 20 which is utilized to oxidize hydrocarbons in the incoming compressed air stream into harmless carbon dioxide and water vapor to thereby remove a relatively high percentage of pre-existing hydrocarbons from the incoming compressed air stream. Hence, the catalytic oxidation system 20 provides treated, substantially hydrocarbon-free, compressed air for delivery to the downstream delivery system and utilization apparatus.

In accordance with a preferred form of the invention, this method and apparatus or system further includes drying of the compressed air, preferably utilizing a regenerative, heat of compression type of drying system or apparatus designated diagrammatically at reference numeral 22. This regenerative type of drying apparatus preferably comprises the type of drying system shown and described in U.S. Pat. No. 3,950,154 issued Apr. 13, 1976, to Terry Henderson. Advantageously, such a heat of compression drying system obtains the necessary heat energy for its operation from the heat of compression generated in the compressor 10. Accordingly, this otherwise wasted heat energy can advantageously be utilized as a relatively low-cost source of heat for the regenerative drying system 22.

As more fully described in the above-referenced U.S. patent, the system 22 operates in part by bypassing and heating some of the air in the system to regenerate the desiccant material utilized in drying. Hence the heating of this air utilizing the heat of compression from compressor 10 advantageously provides the necessary heat energy at very little additional cost.

Figure 2:
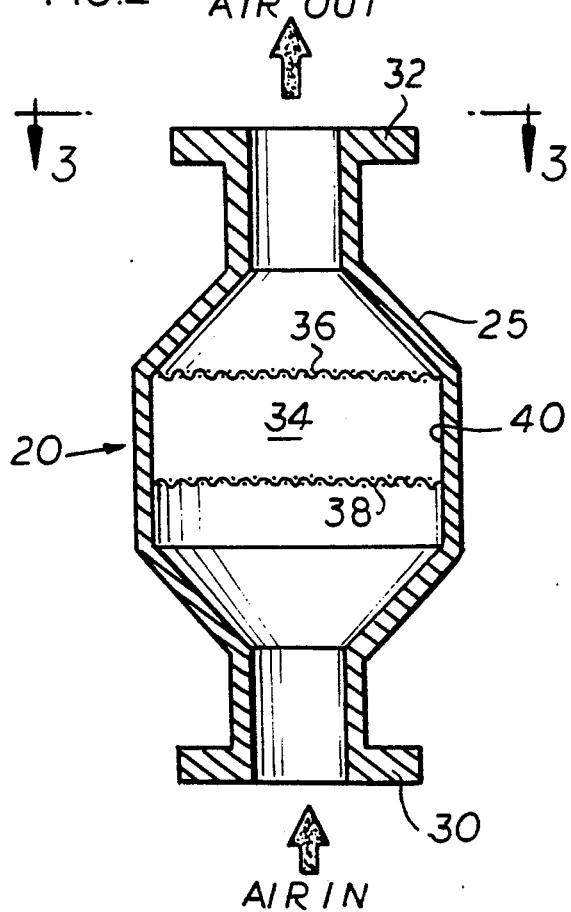
FIG. 2 is an enlarged axial section of the catalytic oxidation system of FIG. 1.
Figure 3:
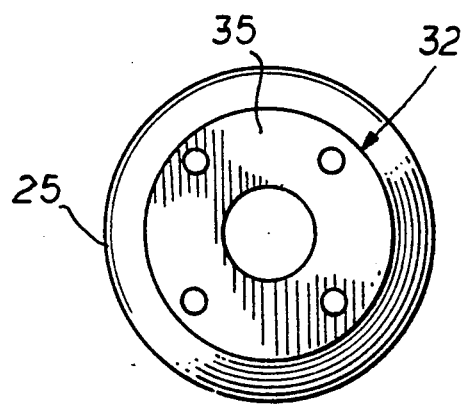
FIG. 3 is a top plan view taken generally in the plane of the line 3—3 of FIG. 2.

Referring now to Figs. 2 and 3, the catalytic oxidation system 20 comprises a vessel 25, here shown in axial section, which includes an inlet air connection 30 and an outlet air connection 32. Both of these air connections are provided with suitable fittings 35 as illustrated in FIG. 3 for coupling the same in series with the outlet 16 of the compressor, and with downstream distribution and utilization equipment which may include the dryer system 22 as illustrated in Fig. 1. Interiorally of the vessel 25 a quantity of a catalyst material 34 is maintained between respective inlet and outlet catalyst retainer screens 36 and 38. Preferably, the inlet and outlet catalyst retainer screens are sufficiently fine to retain the catalyst material therebetween while allowing the free passage of air therethrough. Hence, the vessel 25 and screens 36 and 38 define a generally tubular chamber 40 filled with a quantity of a predetermined catalyst material 34.

This catalyst material 34 may comprise pelleted or pelletized material or a porous, solid monolith material. Moreover, different catalysts may be utilized without departing from the invention. In this regard, the form and identity of catalysts utilized may be determined by the requirements of a given system. Such factors as the desired percentage of hydrocarbon removal, as well as the useful service life of a given catalyst and its capacity for hydrocarbon removal to the desired percentage with a given flow rate of air all must be taken into consideration. Moreover, in order to provide a commercially attractive unit, the ratio of the cost of catalyst per unit weight as against its capacity for treatment at a given flow rate of air must be taken into consideration. Accordingly, it will be recognized that different catalysts may be useful and economically feasible, given the requirements of a particular system.

An important feature of the method and system of the invention, is its ability to successfully oxidize and remove oil vapor at a surprisingly low temperature relative to previously known systems and methods. For example, the system taught by U.K. patent No. GB 1,103,693 specifically requires relatively high temperatures on the order of between 500° C. to 600° C. to effect the oxidation. This patent does not contemplate useful temperatures below about 350° C. in any event, and contemplates that continuous heat must be added to the system at all times to bring the catalyst temperature up to the required operating range. Similarly, automotive catalysts which conduct a similar type of oxidation also operate at a similar temperature range.

Departing from the conventional practice, we have found that the use of a sufficiently active catalyst (a "high-activity" catalyst) will permit oxidation to occur at temperatures below 500° F. (260° C.). Accordingly, the method and system of the invention operate at a relatively low reaction temperature which may, in many cases, be supplied by the compressor heat already present in the system. Even in compressed air systems not operating at a sufficiently high temperature, our novel system and method permits great savings in energy consumption since considerably less heat energy must be added than that called for, for example, in the above-mentioned U.K. patent.

We have found that one particularly useful high-activity catalyst meeting the above low-temperature oxidation criteria comprises an aluminum oxide pellet substrate which is coated with substantially one percent platinum by weight. Alternatively stated, the platinum content is preferably in the range of from substantially 50 to 200 grams and more preferably still on the order of substantially 100 grams of platinum per cubic foot of substrate. Such a material may b obtained from ASACC Industrial Catalyst, Allied Signal Inc., Tulsa, Okla. Allied Signal produces catalyst materials of this general type by a proprietary process, which process and the class of catalyst materials produced thereby are identified as Allied Signal's PURZAUST ® oil mist oxidation catalyst. In order to obtain a specific catalyst made by this process, it is necessary to specify the particular requirements and desired uses of the catalyst, for example, as has been done hereinabove.

We have found that good results can be obtained with an 0.5 percent or greater and preferably a commercial two-percent platinum catalyst material (i.e., a catalyst material having a platinum content of on the order of 0.5 percent or greater by weight, and preferably 2 percent by weight) on a carrier or substrate of spherical pelletized alumina material. However, it may be reasonably expected that similar performance may be obtained from catalysts utilizing little or none of this relatively expensive platinum material. Also, different substrates or carriers may be utilized. Moreover, in selecting a catalyst, at least two design parameters based upon two types of lubricated compressors must be taken into consideration.

The first design parameters are based on lubricated reciprocating type compressors. In such compressors, oil carry-over may vary from between 5 and 100 ppm by weight. The typical discharge temperatures of such compressors vary from 250 degrees F. to 350 degrees F. Typical lubricating oils are SAE 30 and SAE 40 weight, both detergent and non-detergent. A second type, lubricated rotary screw-type compressors, normally operate at temperatures ranging from 100 degrees F. to .200 degrees F. These compressors often use lighter weight oils as lubricants.

Typically, the air pressure entering the catalytic oxidation 20 will be on the order of 100 PSIG, although it can be much lower or much higher. Optimally, the selection of the catalyst and design of the screens 36 and 38 will be such that the pressure drop across the inlet and outlet 30, 32 is no greater than on the order of 2 PSIG. In addition to the above-described catalyst, the catalyst utilized in the oxidation system may comprise one or more of the following material: platinum, palladium, nickel, cobalt, iron, rhodium, manganese, copper, on a substrate or carrier comprising alumina or silica or crystalline aluminosilicates or zeolites having a surface area greater than 20 $m^2/g$, suitable pore size, suitable pore volume and resistance to mechanical and chemical fatigue.

Referring now also to FIGS. 4 and 5, there is illustrated a further embodiment of a catalytic oxidation system (FIG. 4) and an air compressor arrangement (FIG. 5) using two catalytic oxidation apparatus of the type shown in FIG. 4. Referring intitially to FIG. 4, a catalytic oxidation apparatus 20a is similar in many respects to the catalytic oxidation apparatus illustrated and described in FIGS. 2 and 3. Accordingly, like elements have been designated by like reference numerals with the suffix a. However, in addition to the structures shown in FIG. 2, the apparatus of FIG. 4 also includes at least one additional heater or heating means 42 which, in the illustrated embodiment, preferably comprises an electric heater of the cartridge type having a tungsten filament 44 or any other suitable electrical resistance heating element.

In addition to the heater 42, or in place thereof, there is illustrated a spark plug 46 or other similar energy adding device. One or both of these heaters or energy adding elements are utilized for the purpose of raising the temperature of the compressed air and/or compressor oil carried therein, and/or the catalyst 34a to better facilitate the complete catalytic conversion of the compressor lubricating oil which may be carried in the air stream into carbon dioxide and water vapor by the catalyst 34a.

It should be understood in this regard that some improvement in the performance of the system may be realized by the use of a catalyst material containing a higher proportion of noble metal. This also renders the apparatus of the invention quite expensive in practice. However, we have found that the performance of the system may be enhanced without the use of a noble metal catalyst (i.e., a platinum-base catalyst) by raising the temperature of operation of the catalyst in the chamber 40. Thus a somewhat less reactive catalyst using less or, perhaps, no noble metal may operate satisfactorily by increasing the operating temperature.

It will be further understood in this regard that the temperature of the compressed air entering the apparatus may be on the order of 250° F. to 350° F., as mentioned above or, alternatively, with some types of compressors as low as 100° F. to 200° F., as also mentioned above. In order to obtain improved catalytic action, we propose adding a heating means either in the form of a heating element or heater 42 and/or a spark plug or similar element 46.

In accordance with yet a further aspect of the invention, in the case of a compressed air system in which a continuous supply of air is not necessary, a single catalytic oxidation element may be used as in FIG. 4, We further propose in such a system to utilize suitable control means, diagrammatically indicated at reference numeral 50 in FIG. 4, for controlling the air flow through the apparatus 20a. In this regard, we propose utilizing or operating the apparatus 20a essentially on an intermittent basis, whereby the heat generated by the exothermic reaction with the catalyst is retained within the housing 25a. When the control 50 is activated to stop the air flow to the housing 25a, this heat will be retained and will build up within the housing 25a, thereby enhancing the catalytic reaction and removing the greater proportion or percentage of the compressor oil from the air within the catalyst chamber 40a. That is, with no air flow to carry away the heat generated in the process, the catalyst temperature should rise, further enhancing the catalyst performance. Moreover, during this offstream or no-flow period, much less energy would be necessary to sufficiently heat the catalyst by either the heater 42 and/or spark plug 46, such that these might also be de-energized by the control means or system 50 during this time.

It should further be recognized that in a typical compressed air system it is important to control the temperature of the air passing from the outlet of the apparatus 20 or 20a in order to avoid damage to downstream compressor system components such as various valves, seals and the like which are designed for operating temperatures on the order of the 100°–350° F. ranges mentioned above. Hence it is important to shut down the air flow at control 50 in the event the temperature achieved by the heater and/or spark plug, exceed the allowable limits of these downstream components. Of course, during no-flow or offstream time, the elevated temperatures will be essentially experienced only within apparatus 20a and air at such elevated temperature will not reach downstream components.

Turning now to FIG. 5, in many operational situations, it is not desirable or practical to shut down the compressed air flow through the system. Accordingly, we propose to use at least two substantially identical catalytic oxidation units such as unit 20a shown at FIG. 4. A suitable control system, diagrammatically illustrated in FIG. 5, is utilized to intermittently switch the air flow from one of the catalytic oxidation units 20a to the other, so as to allow some period of offstream or no-flow condition for each unit for the improved catalytic action as described above with reference to the apparatus of FIG. 4. That is, the above-described offstream or no-flow period can be utilized with or without activation or de-activation of the heater and/or spark plug elements by use of appropriate control devices, including timers, valves, and the like as diagrammatically illustrated in FIG. 5.

Briefly, FIG. 5 illustrates an additional and optional prefilter 52 which may isolate and remove some of the compressor oil from the compressed airstream. A flow regulating valve 53 may be connected in line following the prefilter 52 and in turn feeds a first or "inlet" three-way valve 54. The three-way valve 54 has its alternatively selectable outlet ports connected to respective inlets 32a and 32a' of the respective catalytic oxidation systems or apparatus 20a and 20a' respectively. A similar "outlet" three-way valve 56 is similarly coupled to the respective outlets 30a and 30a' of the two catalytic oxidation units. The outlet three-way valve 56 is connected to the instrument air outlet, which may be further directed initially to a desiccant or drying system 22, as mentioned hereinabove with respect to FIG. 1.

A suitable control for the respective three-way valves 54 and 56 may take the form of a cylinder-type of valve actuator 58, which is in turn controlled in its operation by a suitable control device 60. The control device 60 may comprise a timer for switching between the two units 20a and 20a' on a preset or preselectable timed basis, or may comprise a suitable condition sensor, such as means for sensing the oil content or some other suitable indicator of system operation for purposes of switching between the respective units 20a and 20a' in an appropriate manner.

The heating of the catalyst may also be accomplished by utilizing the heat of compression obtained rom the compressor without departing from the invention.

While particular embodiments of the invention have been shown and described in detail, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

The invention is claimed as follows:

1. A compressed air system comprising in combination: an air compressor having a compressed air outlet wherein compressed air is discharged to a delivery system coupled to downstream utilization apparatus; and a catalytic oxidation system having an inlet coupled to said compressor outlet to receive said compressed air therefrom, and comprising a treatment chamber containing a quantity of a catalytic oxidizing material for oxidizing compressor oil carried in the compressed air into carbon dioxide and water to thereby form treated compressed air having a predetermined percentage of pre-existing compressor oil removed therefrom, an outlet coupled with said delivery system for delivering said treated compressed air therethrough to said downstream utilization apparatus; and control means for periodically stopping the air flow to said catalytic oxidation system for allowing further heat buildup therein to further enhance the catalytic reaction therein; wherein said catalytic oxidizing material comprises a high-activity catalyst effective at an operating temperature below about 500° F. (260° C.).

2. A system according to claim 1 in which said catalyst comprises a concentration in the range of from 50 grams to 200 grams of platinum per cubic foot an a substrate of pelletized aluminum oxide.

3. A system according to claim 1 and further including dryer means interposed in series with said compressed air discharge and said catalytic oxidation system for drying said compressed air.

4. A system according to claim 3 wherein said dryer means comprises a heat of compression-type regenerative dryer for using heat of compression generated by said air compressor as a source of heat energy for the regenerative drying of the compressed air discharged therefrom.

5. A system according to claim 1 wherein said catalytic oxidation system comprises a generally tubular chamber containing a quantity of a predetermined catalyst.

6. A system according to claim 5 wherein said catalyst comprises one or more of platinum, palladium, nickel, cobalt, iron, rhodium, manganese, and copper, on a substrate comprising alumina or silica or crystalline aluminosilicates or zeolites having a surface area greater than 20 m$^2$/g, a predetermined pore size, a predetermined pore volume and resistance to mechanical and chemical fatigue.

7. A system according to claim 5 wherein said predetermined catalyst comprises a 0.5 percent or greater concentration of platinum, by weight, on a substrate.

8. A system according to claim 1 wherein said catalytic oxidation system further comprises a generally tubular vessel defining a chamber, an inlet catalyst retainer screen extending transversely across said chamber at a first, inlet side thereof; an outlet catalyst retainer screen extending transversely across said chamber at a second, outlet side thereof; and a quantity of catalyst substantially filling said chamber intermediate said inlet and outlet catalyst retainer screens.

9. A system according to claim 8 wherein said catalytic oxidation system further comprises an air inlet connection coupled with said inlet side of said chamber and an air outlet connection coupled with said outlet side of said chamber.

10. A compressed air system according to claim 1 and further including a second catalytic oxidation system having an inlet coupled to said compressor outlet and an outlet coupled to said downstream utilization apparatus, and wherein said control means further includes valve means coupled to said two catalytic oxidation systems for alternating the flow of compressed air to one or the other thereof in a controlled, intermittent fashion, so as to permit said periodic stopping of air flow to each said catalytic oxidation system for allowing further heat buildup therein to further enhance the catalytic reaction therein, while maintaining a flow of compressed air to said downstream utilization apparatus at all times.

11. A compressed air system according to claim 1 and further including heating means in the treatment chamber of said catalytic oxidation system.

12. A catalytic oxidation system for removing compressor oil from a compressed air stream comprising: a generally tubular housing having an air inlet connection for coupling to a source of compressed air and an air outlet connection to be coupled to a downstream delivery system and utilization equipment; an inlet catalyst retainer screen extending transversely across said chamber at a first, inlet side thereof in communication with said inlet air connection; an outlet catalyst retainer screen extending transversely across said chamber at a second, outlet side thereof in communication with said outlet air connection and spaced apart from said inlet catalyst retainer screen; and a quantity of predetermined catalyst substantially filling said chamber between said inlet catalyst retainer screen and said outlet catalyst retainer screen, and control means for periodically stopping the air flow to said tubular housing system for allowing further heat buildup therein to further enhance the catalytic reaction therein; wherein said catalyst comprises a high-activity catalyst effective at an operating temperature below about 500° F. (260° C.).

13. A system according to claim 12 in which said catalyst comprises a concentration in the range of from 50 grams to 200 grams of platinum per cubic foot on a substrate of pelletized aluminum oxide.

14. A system according to claim 12 wherein said catalyst comprises one or more of platinum, palladium, nickel, cobalt, iron, rhodium, manganese, and copper, on a substrate comprising alumina or silica or crystalline aluminosilicates or zeolites having a surface area greater than 20 m$^2$/g, a predetermined pore size, a predetermined pore volume and resistance to mechanical and chemical fatigue.

15. A system according to claim 12 wherein said predetermined catalyst comprises a 0.5 percent or greater concentration of platinum, by weight, on a substrate of spherical pelletized alumina material.

16. A catalytic oxidation system according to claim 12 and further including a second tubular housing, having a chamber filled with a quantity of said predetermined catalyst and having an inlet coupled to said compressor outlet and an outlet coupled to said downstream utilization apparatus, and wherein said control means further includes means coupled to said two tubular housings for controlling the direction of compressed air to one or the other thereof in a controlled, intermittent fashion, so as to permit said periodic stopping of air flow to each said catalyst-filled chamber for allowing further heat buildup therein to further enhance the catalytic reaction therein.

17. A catalytic oxidation system according to claim 12 and further including heating means in the catalyst-filled chamber of each said tubular housing.

18. A compressed air system comprising in combination: an air compressor having a compressed air outlet wherein compressed air is discharged to a delivery system coupled to downstream utilization apparatus; and a catalytic oxidation system having an inlet coupled to said compressor outlet to receive said compressed air therefrom, and comprising a treatment chamber containing a quantity of a high-activity catalyst for oxidizing compressor oil carried in the compressed air into carbon dioxide and water to thereby form treated compressed air having a predetermined percentage of pre-existing compressor oil removed therefrom, and an outlet coupled with said delivery system for delivering said treated compressed air therethrough to said downstream utilization apparatus; wherein said high-activity catalyst comprises a catalyst effective at an operating temperature below about 500° F. (260° C.).

19. A compressed air system according to claim 18 in which said catalyst comprises a concentration in the range of from 50 grams to 200 grams of platinum per cubic foot of substrate of pelletized aluminum oxide.

20. A catalytic oxidation system for removing compressor oil from a compressed air stream, comprising in combination: an air inlet coupled to receive said stream of compressed air, a treatment chamber containing a quantity of a high-activity catalyst for oxidizing any compressor oil carried in the compressed air into carbon dioxide and water to thereby form treated compressed air having a predetermined percentage of pre-existing compressor oil removed therefrom, and an outlet coupled with a delivery system for delivering said treated compressed air therethrough to downstream utilization apparatus; wherein said high-activity catalyst comprises a catalyst effective at an operating temperature below about 500° F. (260° C.).

21. A compressed air system according to claim 20 in which said catalyst comprises a concentration in the range of from 50 grams to 200 grams of platinum per cubic foot on a substrate of pelletized aluminum oxide.

* * * * *